(12) United States Patent
Wallhaeusser et al.

(10) Patent No.: US 7,860,381 B2
(45) Date of Patent: Dec. 28, 2010

(54) HEATING DEVICE FOR DIESEL FUEL AND HEATABLE DIESEL FILTER SYSTEM

(75) Inventors: Kai Wallhaeusser, Graben-Neudorf (DE); Gerhard Thome, Kronau (DE); Willi Arnold, Rohrbach (DE)

(73) Assignee: Eichenauer Heizelemente GmbH & Co. KG, Kandel (DE)

( * ) Notice: Subject to any disclaimer, the term of this patent is extended or adjusted under 35 U.S.C. 154(b) by 691 days.

(21) Appl. No.: 11/983,520

(22) Filed: Nov. 9, 2007

(65) Prior Publication Data
US 2008/0124062 A1 May 29, 2008

(30) Foreign Application Priority Data
Nov. 21, 2006 (DE) .................. 10 2006 055 216

(51) Int. Cl.
*F24H 1/10* (2006.01)
*B60L 1/02* (2006.01)
(52) U.S. Cl. ...................... 392/485; 219/205
(58) Field of Classification Search ......... 392/465–496; 219/202–208
See application file for complete search history.

(56) References Cited

U.S. PATENT DOCUMENTS

| | | | |
|---|---|---|---|
| 3,842,188 A | 10/1974 | Petersen | |
| 3,966,447 A | 6/1976 | Asahara et al. | |
| 4,635,026 A | 1/1987 | Takeuchi | |
| 5,153,555 A | 10/1992 | Enomoto et al. | |
| 5,186,133 A * | 2/1993 | Watanabe et al. | 123/179.14 |
| 5,879,149 A * | 3/1999 | Briggs et al. | 431/208 |
| 6,402,943 B1 | 6/2002 | Bohlender | |
| 2009/0162041 A1 * | 6/2009 | Beetz et al. | 392/485 |

FOREIGN PATENT DOCUMENTS

| | | |
|---|---|---|
| DE | 3433196 A1 | 3/1985 |
| DE | 248 016 A1 | 7/1987 |
| DE | 4040258 A1 | 2/1992 |
| DE | 20 2005 006 326 U1 | 10/2006 |
| EP | 1036930 A1 | 9/2000 |
| WO | WO 2006/094921 A1 | 2/2006 |

* cited by examiner

*Primary Examiner*—Daniel Robinson
(74) *Attorney, Agent, or Firm*—Walter A. Hackler

(57) ABSTRACT

The invention relates to a heating device for diesel fuel comprising at least one PTC heating element (8), at least two contact sheets (7) each comprising a front face (10) by means of which they contact the PTC heating element (8) electrically, wherein the PTC heating element (8) is provided between the front faces (10) of the two contact sheets (7); a plastic housing (2) enclosing an interior space through which the diesel fuel to be heated can flow and in which the PTC heating element (8) and the contact sheets (7) are provided. According to the invention, it is provided that the front faces (10) of the contact sheets (7) project, on at least one longitudinal side, over the PTC heating element (8) so that a gap is provided between the opposing front faces (10) of the contact sheets (7), that the housing (2) comprises positioning elements (11) projecting into its interior space, engaging into the gap and, as a stop, securing the PTC heating element (8) against lateral displacement, and that the contact sheets (7) each have at least one leg (12) bent away from the front face (10) and being pressed into the housing (2) with prestress so that the front faces (10) of the contact sheets (7) are pressed against the PTC heating element (8) by spring forces exerted by the legs (12).

18 Claims, 4 Drawing Sheets

HEATING DEVICE FOR DIESEL FUEL AND HEATABLE DIESEL FILTER SYSTEM

This invention relates to a heating device for diesel fuel comprising at least one PTC heating element, at least two contact sheets to conduct a heating current through the at least one PTC heating element, the contact sheets each comprising a front face by means of which they contact the PTC heating element electrically, the PTC heating element being provided between the front faces of the two contact sheets. The heating device also comprises a plastic housing enclosing an interior space through which the diesel fuel to be heated can flow and in which the PTC heating element and the contact sheets are arranged. The invention furthermore relates to a diesel filter system with such a heating device. Such a heating device as well as a corresponding diesel filter system are known from EP 1 036 930 B1.

A heater is required for heating the diesel fuel so that diesel engines reliably operate even in the cold.

It is an object of the invention to show how a heating device of the above-mentioned type can be manufactured more cost-effectively.

This object is solved according to the invention in that the front faces of the contact sheets project, on at least one longitudinal side, over the PTC heating element so that a gap is provided between the opposing front faces of the contact sheets, and that the housing comprises at least one positioning element engaging into the gap and, as a stop, securing the PTC heating element against lateral displacement, and that the contact sheets each have at least one leg bent away from the front face and being pressed into the housing with pre-stress so that the front faces of the contact sheets are pressed against the PTC heating element by spring forces exerted by the legs.

When the contact sheets and the interposed PTC heating element are pushed into the housing of the heating device, the PTC heating element is positioned of its own accord by the positioning elements of the housing. The spring forces exerted by the legs have the effect that the PTC heating element has a good electrical and thermal contact to the front faces of the contact sheets. In contrast to the heating device known from EP 1 036 930 B1 in which the PTC heating element was pre-mounted to a unit with contact and heat conducting sheets by means of adhesive bonding, riveting or screwing, no complex measures are required, in a heating device according to the invention, for positioning the PTC element or for connecting the PTC element with the contact sheets. In particular, it is unnecessary to use an assembly frame which combines the PTC heating element and the contact sheets to a preassembled unit and which is built into the housing. A heating device according to the invention thus has the advantage of comprising only few parts which can, furthermore, be assembled with little expenditure.

The contact sheets of a heating device according to the invention have a triple function which enables the heating device to be constructed from very few components and to be easily assembled. The contact sheets are used to electrically contact the PTC heating element, to fix the PTC heating element in position, and to efficiently emit heat to the diesel fuel to be heated.

During insertion of the contact sheets with the interposed PTC heating element, the contact sheet legs, which are bent away from the front face, are compressed by spring action so that the front faces of the contact sheets are pressed against the PTC heating element. This effects good electrical and thermal contact, as well as a fixation of the PTC heating element by clamping forces. The contact sheets are further-more used as heat conducting sheets since the heat generated by the PTC heating element is diverted via the legs of the contact sheets so that any diesel fuel flowing through the housing is exposed to a particularly large surface via which it can absorb heat. A heating device according to the invention therefore no longer needs heat conducting sheets in addition to contact sheets and so that the number of components is reduced.

Additional details and advantages of the invention are explained on the basis of an exemplary embodiment with reference to the enclosed drawings. The features described therein can be made, individually or in combination, the subject of claims. In the Figures:

Figure 1:
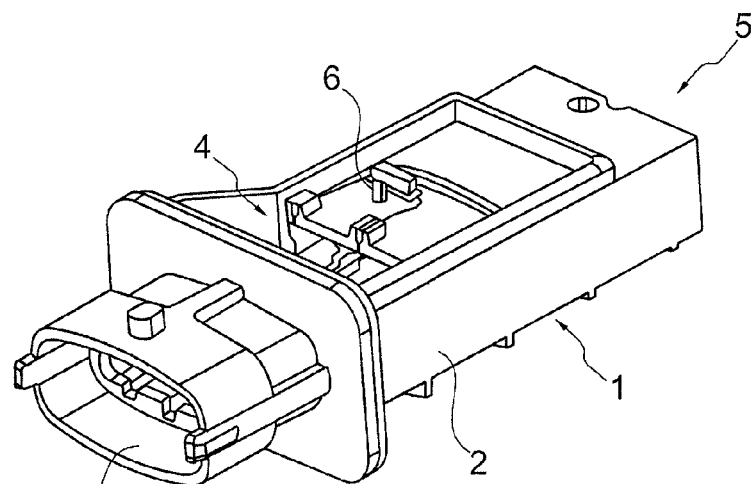
FIG. 1 shows a diagonal view of an exemplary embodiment of a heating device according to the invention.

The exemplary embodiment of a heating device 1 for heating diesel fuel as shown in FIG. 1 has a one-piece plastic housing 2 with a socket 3 for a plug-in contact for the connection to a power source. The housing has a tubular housing section with two openings 4, 5 so that diesel fuel to be heated can flow through an interior space enclosed by the housing. The plastic housing 2 can be cheaply manufactured as an injection-molded part, for example from polyamide, in particular, from fiberglass-reinforced polyamide. Instead of a plastic housing 2, a metal housing may also be used which can be electrically insulated towards the contact sheets 7 as far as required, for example by a suitable coating or an intermediate layer of a plastic film.

The housing 2 carries a temperature sensor 6, for example an NTC-resistor, which can be connected via the socket 3 to a control unit of a diesel filter system so that the heat output can be controlled or, respectively, switched according to demand specified by the temperature of the diesel fuel.

Figure 2:
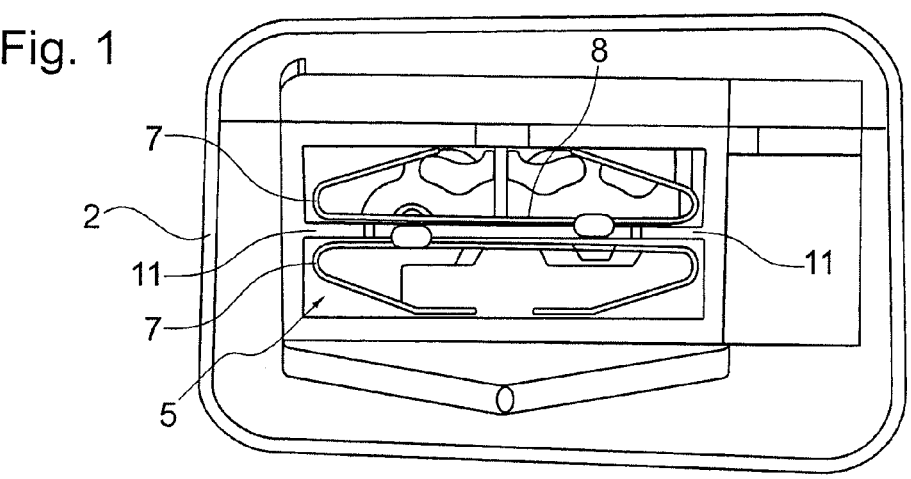
FIG. 2 shows the exemplary embodiment shown in FIG. 1 in a rear view.
Figure 5:
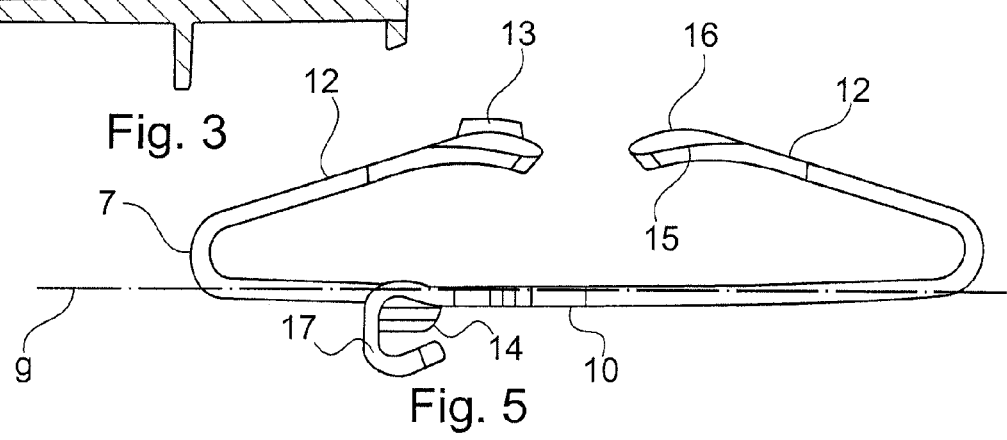
FIG. 5 shows a contact sheet of the exemplary embodiment shown in FIG. 1, in an uncompressed condition.
Figure 6:
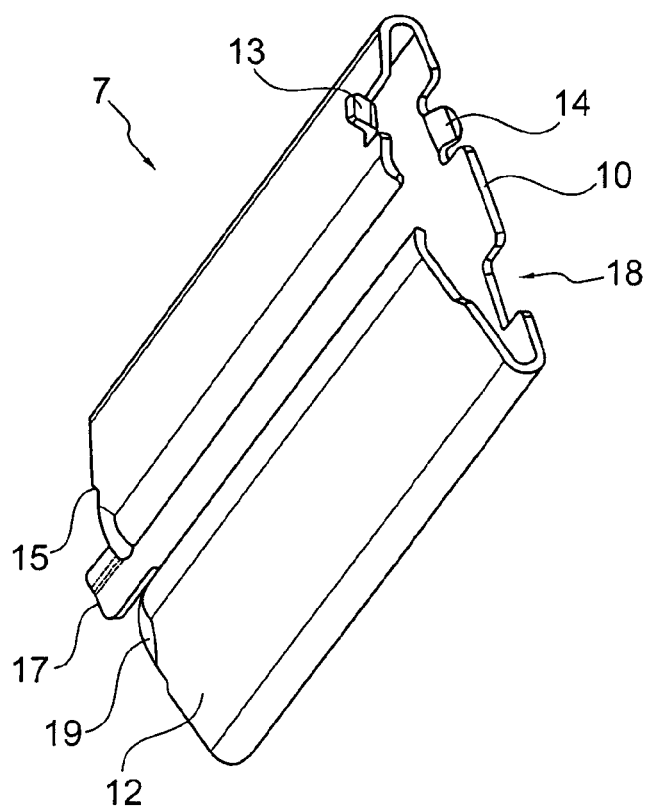
FIG. 6 shows the contact sheet shown in FIG. 5 in a diagonal view.
Figure 7:
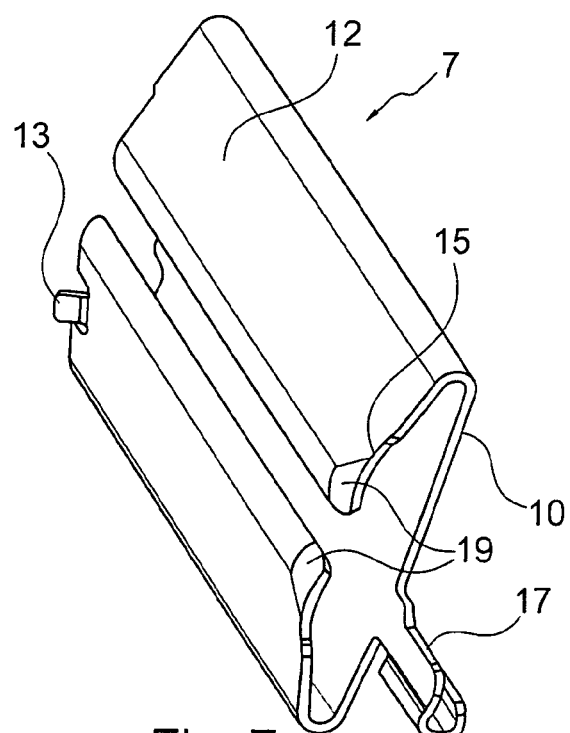
FIG. 7 shows another diagonal view of the contact sheet.

FIG. 2 shows the exemplary embodiment shown in FIG. 1 in a rear view, with a view into the housing opening 5. The housing 2 encloses two contact sheets 7 between which at least one PTC heating element 8 is provided. FIGS. 5 to 7 show details of the contact sheet 7. The contact sheets 7 each have a front face 10 by means of which they electrically contact the plate-shaped PTC heating element 8 and pass a heating current through it. The PTC heating element 8 is squeezed between the front faces 10 of the two contact sheets 7. The front faces 10 of the contact sheets 7 project on opposite longitudinal sides beyond the PTC heating element 8 so that a gap is provided between the opposing front faces 10 of the contact sheets 7. Positioning elements 11 engage in this gap and, as a stop, secure the PTC heating element 8 against lateral displacement.

Figure 3:
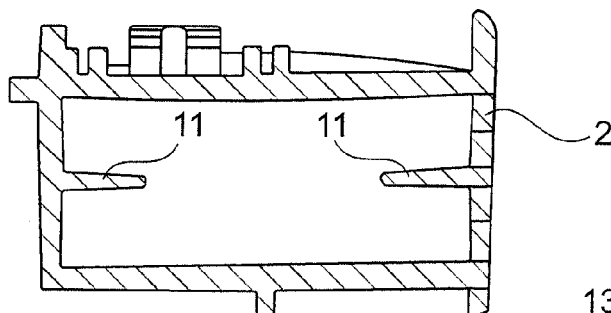
FIG. 3 shows a cross-section through the housing of the exemplary embodiment shown in FIG. 1.
Figure 4:
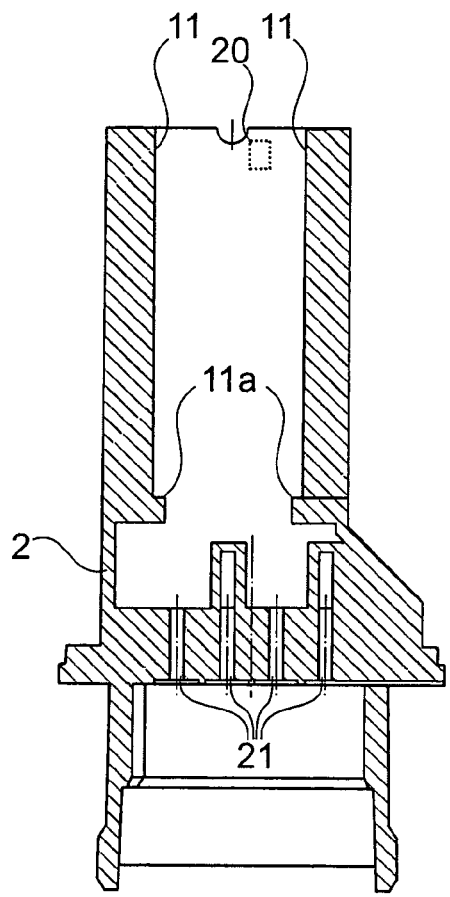
FIG. 4 shows a longitudinal section through the housing along the positioning elements.

The positioning elements 11 are designed in one piece with the plastic housing 2 and can be seen, in particular, in the cross-sectional view of housing 2 shown in FIG. 3. The positioning elements 11 projecting into the interior space of the housing 2 are projections which are preferably designed as positioning ridges, but can also be designed as a series of pins, for example. FIG. 4 shows a longitudinal section through the housing 2 along the positioning elements 11, designed as positioning ridges. It can be seen therein that the positioning ridges 11 have a stop 11a which prevents that the PTC heating element 8 can be pushed further into the housing 2 than up to a position defined by the stops 11a.

The contact sheets 7 shown in FIGS. 2, 5, 6 and 7 each have two legs 12 bent away from the front face 10 and are pressed with prestress into the housing 2 so that the front faces 10 of the contact sheets 7 are pressed against the PTC heating element 8 by means of spring forces exerted by the legs 12. In principle, this effect can also be achieved by a contact sheet with only one single leg bent away from the front face 10.

Due to the spring forces exerted by the legs 12, the contact sheets 7—via their front faces 10—are not only in electrical contact with the PTC heating element 8 but also in good thermal contact so that heat generated by the PTC heating element 8 can be efficiently emitted. The legs 12 are bent away from the front face 10 such that the contact sheets 7 each form a flow channel for the diesel fuel to be heated. In this manner, heat generated by the PTC heating element 8 can be efficiently emitted over a large surface to the diesel fuel flowing through the housing 2.

For efficient heat emission, it is advantageous that diesel fuel can flow around on both sides of the legs 12 in housing 2 in the arrangement shown in FIG. 2, i.e. that the legs can dissipate heat with their front side and their rear side. This is achieved by the contact sheets 7 forming a first flow channel which they tubularly enclose, and that further flow channels are additionally provided between the outside of the legs 12 and the housing 2 so that diesel fuel is able to flow past not only on the inside but also on the outside of the legs 12. Accordingly, the legs 12 are pressing against the housing 2 only in a strip shaped area. In the exemplary embodiment shown, the legs 12 rest against the housing in a line.

In the exemplary embodiment shown, a particularly simple fixation of the PTC heating element 8 is achieved by the cooperation of the positioning elements 11 of the housing 2 with the pressed-in contact sheets 7 so that cost-efficient assembly will be possible. It is sufficient to position the PTC heating element 8 between the two contact sheets 7 and to push it then into the opening 5 of the housing 2. To additionally facilitate assembly and to still better position the PTC heating element 8, at least one of the contact sheets 7 is preferably provided with a lug 14 for fixing the PTC heating element 8. In the exemplary embodiment shown, each of the two contact sheets 7 is provided with a lug 14 which can be seen, in particular, in the diagonal view of the contact sheet 7 shown in FIG. 6. These lugs 14 grip around the plate-shaped PTC heating element 8 so that the two contact sheets 7 and the PTC heating element 8 form a unit which is easier to handle in the assembly. It is, of course, also possible to arrange several PTC heating elements 8 between the two contact sheets 7; in such a case, it may be advantageous to increase the number of lugs 14. To counteract the risk of electrical shorts between the two contact sheets 7, the contact sheets 7 may be provided with a recess 18 shown in FIG. 6 which is located opposite the lug 14 of the opposite contact sheet 7.

The legs 12 of the contact sheets 7 have an edge bent towards the front face 10. This measure has the advantage that the contact sheets 7 can be more easily pushed into the opening 5 and additionally increases the heat exchanger surface.

To facilitate assembly, the contact sheets 7 are provided on their lateral upper edge 15 with an insert bevel 19 shown in FIG. 7. Due to this insert bevel 19, the upper lateral edge 15 of the leg 12 on the insert end of the contact sheet 12 is provided closer to the front face 10 than the upper lateral edge 16 on the other end of the contact sheet 7. The insert bevels 19 facilitate pushing the contact sheets 7 together with the interposed PTC heating element 8 into the housing 2.

It is advantageous to provide one of the contact sheets 7, preferably both, with a snap catch 13 for snap-in locking with the housing 2. The housing 2 has a recess 20 shown in FIG. 4 into which the snap catch 13 engages. In the exemplary embodiment shown, the snap catch 13 is provided on one of the legs 12 of the contact sheet 7. The snap catch 13 is provided on that end of the contact sheet 7 which is opposite the insert bevel 19 so that the assembly is not impaired by the snap catch 13.

To improve the thermal coupling of the contact sheets 7 to the PTC heating element 8, the front faces 10 of the contact sheets 7 have a convex curvature in uncompressed condition. The prestress generated when pressing the contact sheets 7 into the housing 2 counteracts this convex curvature so that a particularly large contact surface and thus a particularly good thermal contact will result. A relatively small curvature is already sufficient to provide a particularly overall surface contact to the PTC heating element 8 resting against the side with the convex curvature. To illustrate the curvature in an uncompressed condition, a straight line g is drawn into FIG. 5. The front face 10 is visibly curved versus this straight line g.

Figure 8:
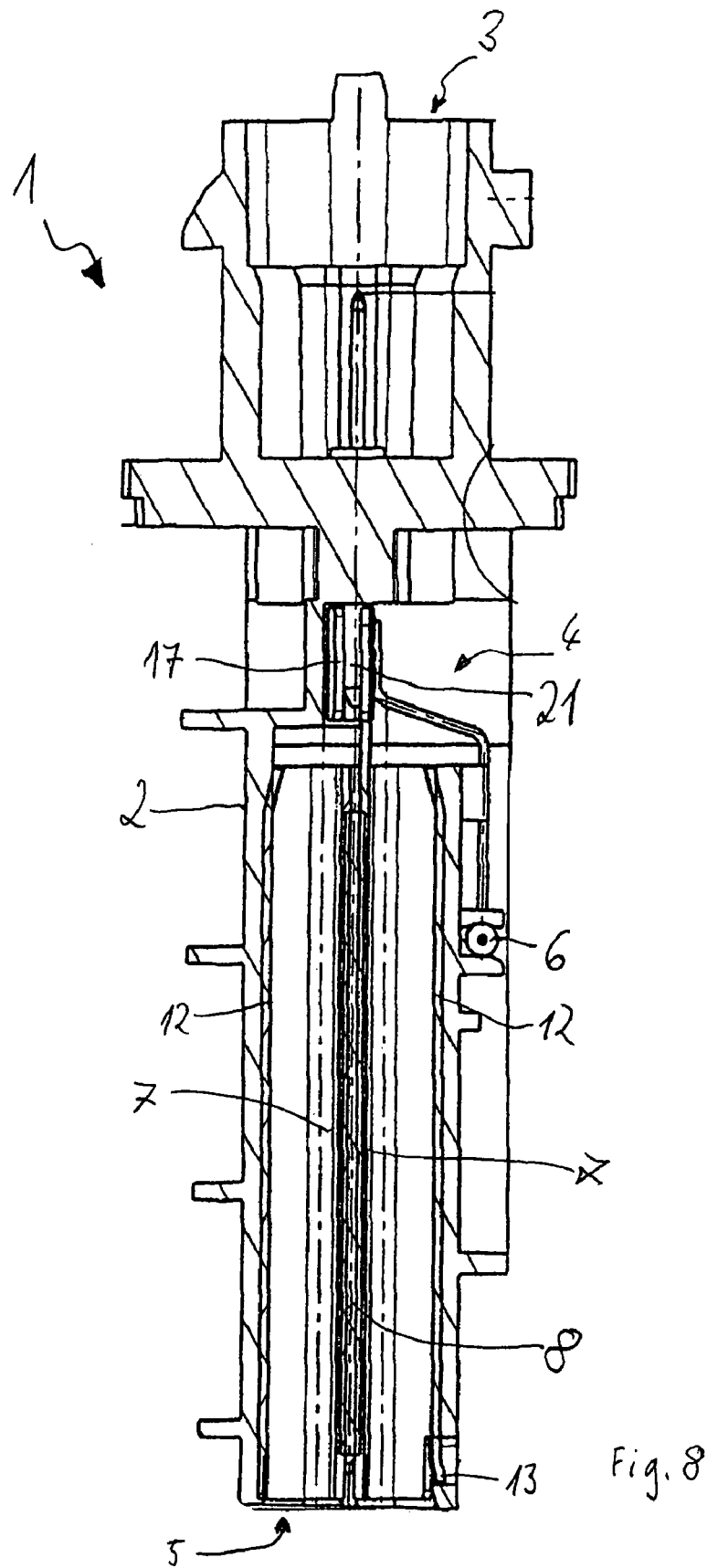
FIG. 8 shows a longitudinal section of the exemplary embodiment shown in FIG. 1.

In FIG. 8, the above described heating device is shown in a longitudinal section. FIG. 8 shows, in particular, the flow channel which extends between the openings 4 and 5 of the housing 2; the diesel fuel to be heated flows through the flow channel and is heated in the process through contact to the contact sheets 7, in particular to their legs 12. The temperature sensor 6 is also clearly shown which—like the supply lines connected to the contact sheets 7—also leads to the socket 3. In the exemplary embodiment shown, the socket 3 is designed for a plug-in connector with four separate connections. Thus, for the supply of the PTC heating element 8 lines for potential and ground are independent of the potential line and the ground line for the connection of the temperature sensor 6.

The contact sheets 7 each have a plug-in connection 17 which encloses a connector pin 21, as shown in FIG. 8. In the longitudinal section of housing 2 shown in FIG. 4, the housing penetrations are shown through which four connector pins 21 are passed. Two of these connector pins 21 are connected with plug-in connections 17 of the contact sheets 7. Two other connector pins 21 are connected to the temperature sensor 6.

Aluminum alloys, in particular AlMgSi alloys, are suitable, for example, as the material for the contact sheets 7. In the described exemplary embodiment, the contact sheets 7 consist of AlMgSi1.

Figure 9:
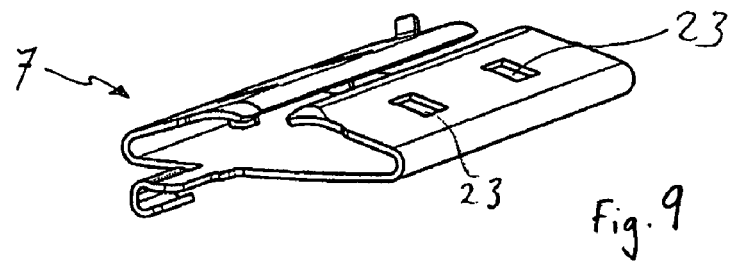
FIG. 9 shows another exemplary embodiment of a contact sheet.
Figure 10:
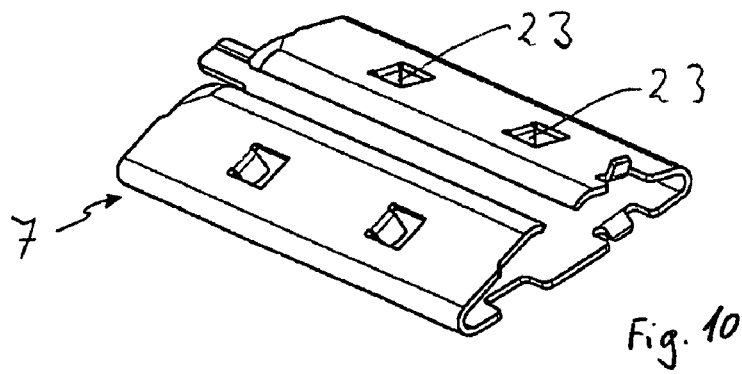
FIG. 10 shows the contact sheet shown in FIG. 9 in another view.

FIGS. 9 and 10 show another exemplary embodiment of a contact sheet 7. The difference to the above-described contact sheet 7 shown, in particular in FIGS. 6 and 7, lies in vortex generating elements 23 for the turbulence of diesel fuel flowing past the contact sheets 7. In the exemplary embodiment shown, the vortex generating elements 23 are bent out of the contact sheet 7 and thus provide a flow resistance. For example, the vortex generating elements 23 can be bent, lug like, out of the legs 12 of the contact sheets 7. The vortex generating elements 23 can also be designed, for example, as corrugations or perforations of the contact sheet 7.

The turbulence created by the vortex generating elements 23 results in an improved emission of heat from the contact sheet 7 to the fluid flowing around. In fact, it has been shown that a turbulent flow absorbs heat better from the contact sheets 7 than a laminar flow.

Figure 11:
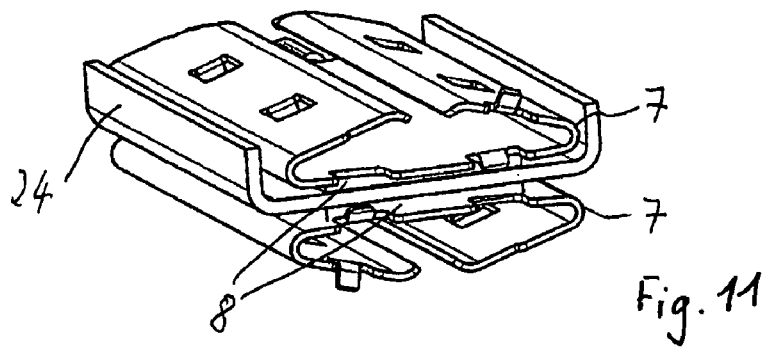
FIG. 11 shows an exemplary embodiment of the contact sheets shown in FIGS. 9 and 10, when several PTC heating elements are used one on top of the other.
Figure 12:
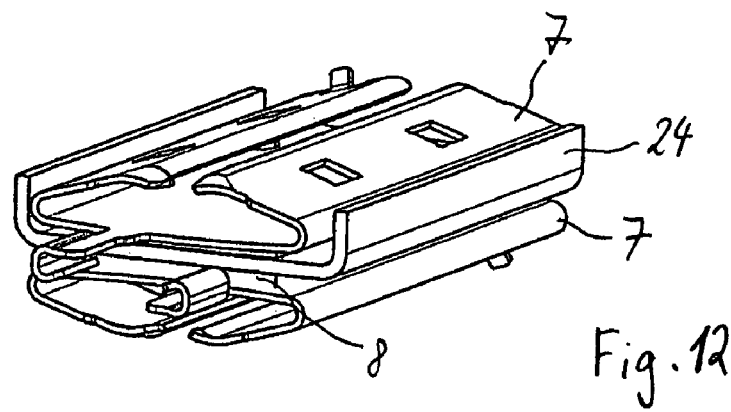
FIG. 12 shows another view regarding FIG. 11.

In the heater insert 1 explained on the basis of FIGS. 1 to 8, only one single PTC heating element 8 is provided between the contact sheets 7. However, such a heater insert 1 can, of course, also be provided with a plurality of PTC heating elements 8 which are arranged side by side, for example in longitudinal direction. FIGS. 11 and 12 show another possibility of providing a plurality of PTC heating elements 8 between the contact sheets 7.

In the exemplary embodiment shown in FIGS. 11 and 12, the PTC heating elements 8 are stacked one over the other. A contact plate 24 is provided between the two layers in which at least one PTC heating element 8 each is provided. For the power supply of the PTC heating elements 8, the contact plate 24 can be connected to potential and the two contact sheets 7 can be connected to ground or vice versa.

The positioning of PTC heating elements 8 can be facilitated by embossings matching the contours of the PTC heating elements 8. Such embossings create indentations which, as compartments, specify the position of the PTC heating elements 8 and can thus facilitate assembly.

For the exemplary embodiment shown in FIGS. 11 and 12, the gap between the two contact sheets 7—in which the positioning elements 11 of housing 2 engage according to specification—is limited on one side by the contact plate 24 and on the other side by one of the contact sheets 7. By means of embossings in the contact plate 24, simple and precise positioning of the PTC heating elements 8 is nonetheless achieved upon assembly of the heater insert 1. The exemplary embodiment shown can, for example, also be modified such that the contact plate 24 does not protrude laterally over the edges of the contact sheets 7 so that a gap results each between the contact plate 24 and one of the two contact sheets 7. Positioning elements 11 of the housing 2 can engage in this gap and, as stops, they can secure the PTC heating elements 8 against lateral displacement.

LIST OF REFERENCE SYMBOLS

1 Heating device
2 Housing
3 Socket
4 Housing opening
5 Housing opening
6 Temperature sensor
7 Contact sheet
8 PTC heating element
10 Front face of the contact sheet 7
11 Positioning element of the housing 2
12 Leg of the contact sheet 7
13 Snap catch
14 Lug
15 Lateral, upper edge of leg 12
16 Lateral, upper edge of leg 12
17 Plug-in connection
18 Recess of the contact sheet 7
19 Insert bevel
20 Recess of the housing 2
21 Connector pin
23 Vortex generating elements
24 Contact plate

The invention claimed is:

1. Heating device for diesel fuel comprising
at least one PTC heating element,
at least two contact sheets to conduct a heating current through the at least one PTC heating element, the contact sheets each comprising a front face by means of which they contact the PTC heating element electrically, the PTC heating element being provided between the front faces of the two contact sheets;
a housing, enclosing an interior space through which the diesel fuel to be heated can flow and in which the PTC heating element and the contact sheets are arranged;
characterized in that the front faces of the contact sheets project, on at least one longitudinal side, over the PTC heating element so that a gap is provided between the opposing front faces of the contact sheets;
the housing comprises at least one positioning element engaging into the gap and, as a stop, securing the PTC heating element against lateral displacement; and
the contact sheets each have at least one leg bent away from the front face and being pressed into the housing with prestress so that the front faces of the contact sheets are pressed against the PTC heating element by spring forces exerted by the legs.

2. Heating device according to claim 1, characterized in that the front faces of the contact sheets project, on opposing longitudinal sides, over the PTC heating element thereby creating gaps on opposing sides of the PTC heating element into which the positioning elements of the housing project and secure the PTC heating element, as a stop, against lateral displacement.

3. Heating device according to claim 1, characterized in that the legs of the contact sheets press against the housing.

4. Heating device according to claim 1, characterized in that the legs can be flowed around on both sides by the diesel fuel to be heated.

5. Heating device according to claim 1, characterized in that the positioning elements are designed as positioning ridges which extend along the PTC heating element.

6. Heating device according to claim 1, characterized in that at least one of the contact sheets comprises a snap catch for snap-in locking with the housing.

7. Heating device according to claim 1, characterized in that at least one of the contact sheets comprises a lug for fixing the PTC heating element.

8. Heating device according to claim 7, characterized in that the contact sheet which is located opposite the contact sheet provided with a lug is provided with a recess located opposite the lug.

9. Heating device according to claim 1, characterized in that the front faces of the contact sheets comprise, in an uncompressed condition, a convex curvature which is counteracted by the prestress generated upon pressing into the housing.

10. Heating device according to claim 1, characterized in that the at least one leg of the contact sheets comprises an edge bent towards the front face.

11. Heating device according to claim 1, characterized in that with at least one of the contact sheets the at least one leg is bent away from the front face such that the contact sheet forms a flow channel for the diesel fuel to be heated.

12. Heating device according to claim 11, characterized in that with at least one of the contact sheets the at least one leg comprises an insert bevel on a lateral upper edge.

13. Heating device according to claim 1, characterized in that at least one of the contact sheets comprises two legs bent away from the front face which are facing each other and resiliently press against the housing under the effect of prestress.

14. Heating device according to claim 1, characterized in that the housing is a one-piece injection-molded part with a socket for a plug-in contact.

15. Heating device according to claim 1, characterized in that the positioning elements form a stop which prevents that the PTC heating element can be pushed into the housing further than up to a position defined by the stop.

16. Heating device according to claim 1, characterized in that the contact sheets comprise vortex generating elements to generate a turbulence of diesel fuel flowing past.

17. Heating device according to claim 16, characterized in that the vortex generating elements are bent out of the contact sheets.

18. Diesel filter system characterized by a heating device according to claim 1.

* * * * *